(12) United States Patent
Mayeu et al.

(10) Patent No.: US 10,294,138 B2
(45) Date of Patent: May 21, 2019

(54) METHOD AND EQUIPMENT FOR MANUFACTURING A HOLLOW GLASS ARTICLE HAVING A SPECIFIC INNER GLASS DISTRIBUTION

(71) Applicant: POCHET DU COURVAL, Paris (FR)

(72) Inventors: Patrice Mayeu, Blangy-sur-Bresle (FR); Sébastien Guerout, Monchaux Soreng (FR)

(73) Assignee: Pochet du Courval, Paris (FR)

( * ) Notice: Subject to any disclaimer, the term of this patent is extended or adjusted under 35 U.S.C. 154(b) by 781 days.

(21) Appl. No.: 14/418,622

(22) PCT Filed: Jul. 23, 2013

(86) PCT No.: PCT/EP2013/065527
§ 371 (c)(1),
(2) Date: Jan. 30, 2015

(87) PCT Pub. No.: WO2014/019893
PCT Pub. Date: Feb. 6, 2014

(65) Prior Publication Data
US 2015/0210582 A1    Jul. 30, 2015

(30) Foreign Application Priority Data

Jul. 30, 2012 (FR) ..................... 12 57378

(51) Int. Cl.
*C03B 9/36* (2006.01)
*B65D 1/02* (2006.01)

(52) U.S. Cl.
CPC .......... *C03B 9/3663* (2013.01); *B65D 1/0207* (2013.01); *C03B 9/3672* (2013.01); *C03B 9/3681* (2013.01); *Y10T 428/131* (2015.01)

(58) Field of Classification Search
CPC ... C03B 7/00; C03B 7/084; C03B 9/36–9/369
See application file for complete search history.

(56) References Cited

U.S. PATENT DOCUMENTS 1,592,299 A * 7/1926 Howard ................. C03B 7/084
65/181
2,725,683 A   12/1955 Lockhart
(Continued)

FOREIGN PATENT DOCUMENTS

DE       596276 C      5/1934
DE      1054670 B      4/1959
(Continued)

OTHER PUBLICATIONS

DE596276C EPO Machine Translation, Performed EPO website Apr. 30, 2018. (Year: 2018).*
(Continued)

*Primary Examiner* — Lisa L Herring
(74) *Attorney, Agent, or Firm* — Knobbe, Martens, Olson & Bear, LLP

(57) ABSTRACT

The method for manufacturing a hollow glass article comprises the following steps:
  introducing a blank (38) of the article into a finishing mold (26), and
  forming the article in the finishing mold (26), by injecting at least one gas and a forming pressure inside the blank (38) of the article.
During formation of the article in the finishing mold (26), at least one gas injection point (54A) is displaced for directing the gas towards at least one predefined area of the blank (38), the gas being injected at least at a finishing pressure in order to form a specific inner glass distribution of the article.

10 Claims, 8 Drawing Sheets

(56) References Cited

U.S. PATENT DOCUMENTS

| | | |
|---|---|---|
| 3,468,648 A | 9/1969 | Nowak |
| 4,781,955 A | 11/1988 | Noe |
| 5,183,673 A | 2/1993 | Schurman |
| 5,713,975 A | 2/1998 | Schonfeld |
| 5,876,478 A | 3/1999 | Imamura et al. |
| 6,923,022 B1 | 8/2005 | Dodd |
| 2007/0214838 A1 | 9/2007 | Fenton |
| 2011/0067449 A1* | 3/2011 | Ringuette ............. C03B 9/3618 65/72 |
| 2014/0212606 A1 | 7/2014 | Pochet Du Courval |
| 2015/0246838 A1 | 9/2015 | Pochet Du Courval |

FOREIGN PATENT DOCUMENTS

| | | |
|---|---|---|
| FR | 1 125 923 A | 11/1956 |
| GB | 2436104 A | 9/2007 |
| JP | S63-295446 A | 1/1988 |
| JP | 2004-018306 A | 1/2004 |
| JP | 2004-238242 A | 8/2004 |
| WO | WO 2012/120119 A1 | 9/2012 |
| WO | WO 2014/019893 A1 | 2/2014 |
| WO | WO 2014/044669 A1 | 3/2014 |

OTHER PUBLICATIONS

English Translation of DE596276C Performed by LinguaLinx Language Solutions May 2018. (Year: 2018).*

International Search Report for International App. No. PCT/EP2012/054127 dated Jun. 6, 2012.

International search Report & Written Opinion, dated Dec. 20, 2013, in International App. No. PCT/EP2013/069257.

Office Action, dated Jun. 3, 2016, in U.S. Appl. No. 14/430,027.

Notice of Allowance, dated Feb. 1, 2017, in U.S. Appl. No. 14/430,027.

International Search Report for International App. No. PCT/EP2013/065527 dated Oct. 16, 2013.

* cited by examiner

METHOD AND EQUIPMENT FOR MANUFACTURING A HOLLOW GLASS ARTICLE HAVING A SPECIFIC INNER GLASS DISTRIBUTION

This application is the U.S. National Phase under 35 U.S.C. § 371 of International Application No. PCT/EP2013/065527, filed Jul. 23, 2013, designating the U.S., and published in French as WO 2014/019893 on Feb. 6, 2014, which claims priority to French Patent Application No. 1257378, filed Jul. 30, 2012, the entire contents of which are incorporated herein by reference.

The present invention relates to a method for manufacturing a hollow glass article wherein:
a blank of the article is introduced into a finishing mold, and
the article is formed in the mold by injection of at least one gas at a forming pressure inside the blank of the article.

The present invention also relates to a hollow glass article obtained by such a manufacturing method, such as for example a flask or any other article of this type.

BACKGROUND OF THE INVENTION

(1) Field of the Invention

The present invention also relates to a facility for manufacturing a hollow glass article comprising:
means for introducing a blank of the article into an imprint of a finishing mold, and
forming means in the finishing mold of the article, said forming means being able to inject at least one gas at a forming pressure inside the blank of the article.

Generally, the manufacturing of hollow glass articles, such as for example flasks, should meet diverse constraints and notably shape constraints, for example the position of the neck, constraints of manufacturing tools, for example for removal from the mold, constraints for distributing the glass and of the weight of the glass and specific constraints related to the packaging.

(2) Description of Related Art

A known method for manufacturing these types of articles consists of introducing into a finishing mold a blank of the article at a determined temperature. The blank being obtained beforehand either by blowing or by pressing in a blank mold, and of forming the article in this finishing mold by injecting, at a given pressure a pressurized gas such as for example air, in order to flatten the glass against the walls of the finishing mold.

It is important that the forming of this type of hollow glass articles and more particularly flasks intended for the perfume industry and for cosmetics, be done rapidly in order to have acceptable production rates. For this purpose, this type of articles is made up to now with standard inner glass distributions. There exist generally three standard inner distribution models: the so-called «marloquette» or «cocked hat», the «water drop» model and the «flat» model.

Moreover it is known how to make outer specific glass distributions on the walls and/or on the bottom of this type of article, for example by using a finishing mold having a specific imprint, or further by means of punches, in order to give a particular outer shape to the flask.

However, notably because of the shape constraints mentioned earlier, these industrial methods are not applicable as such for obtaining a hollow article having a specific inner glass distribution, different from the three standard aforementioned distributions, and thus allow the inside of the flask to be sculpted in order to give it a particular esthetical design.

BRIEF SUMMARY OF THE INVENTION

One of the objects of the invention is therefore to propose a method and a facility for making a hollow article giving the possibility of obtaining a hollow article having a specific and customizable inner glass distribution, while retaining acceptable production rates.

For this purpose, the object of the invention is a manufacturing method of the aforementioned type, wherein, during the forming of the article in the finishing mold, at least one gas injection point is moved so as to direct the gas towards at least a predefined area of the blank, the gas being injected at least at a finishing pressure in order to form a specific glass inner distribution of the article.

By injecting the gas at a particular finishing pressure in particular areas of the inside of the hollow article gives the possibility of giving these areas a particular shape and thereby obtain a hollow article, the inside of which is «sculpted».

According to other advantageous aspects of the invention, the manufacturing method comprises one or more of the following features, taken individually or according to all the technically possible combinations:
during the forming of the article in the finishing mold, said or each injection point of the gas is moved by longitudinal translation in order to direct the gas toward certain discretely distributed areas of the blank, at least between a first injection position of the gas inside the blank and a second position of injection of the gas inside the blank;
during the forming of the article in the finishing mold, said or each injection point of the gas is moved by rotation in order to direct the gas towards certain discretely distributed areas of the blank;
during the formation of the article in the finishing mold, a portion of the injected gas is discharged towards the outside of the finishing mold;
during the forming of the article in the finishing mold, a profile of pressures extending between a minimum pressure substantially equal to 3 bars and a maximum pressure substantially equal to 7 bars is applied to the injected gas at least at the finishing pressure;
the method further comprises, before introducing a blank of the article into a finishing mold, the following steps:
introducing into a blank mold at least one molten glass parison, and
forming in the blank mold the blank of the article from said at least one parison;
during the forming of the article in the finishing mold, said or each injection point of the gas is moved relatively to the blank.

The object of the invention is also a hollow glass article obtained by such a manufacturing method, the hollow article having a specific inner glass distribution.

The object of the invention is also a manufacturing facility of the aforementioned type, wherein the forming means comprise means for displacing at least one injection point of the gas, the displacement means being able to direct the gas towards at least one predefined area of the blank, the gas being injected at least at a finishing pressure in order to form a specific inner glass distribution of the article.

According to other advantageous aspects of the invention, the manufacturing facility comprises one or more of the following features, taken individually or according to all the technically possible combinations:

- the displacement means comprise a nozzle for injecting at least gas towards at least one predefined area of the blank, the injection nozzle extending along a longitudinal axis and comprising at least one gas outlet orifice inside the finishing mold, said or each orifice forming an injection point of the gas able to be moved by the nozzle;
- the injection nozzle is mounted so as to be movable in longitudinal translation at least between a first injection position of the gas inside the blank and a second injection position of the gas inside the blank;
- the injection nozzle is mounted so as to be movable in rotation around its longitudinal axis;
- the injection nozzle comprises at least two outlet orifices, said at least two orifices having different shapes and/or diameters;
- the forming means comprise at least one aperture for discharging the gas towards the outside of the finishing mold;
- the facility further comprises means for applying a pressure profile to the injected gas at least at the finishing pressure, said pressure profile extending between a minimum pressure substantially equal to 3 bars and a maximum pressure substantially equal to 7 bars;
- the facility further comprises at least one distributor of molten glass parisons, a blank mold including an imprint intended to successively receive at least one molten glass parison, and means in the blank mold for forming the blank of the article;
- the means for displacing at least one injection point of the gas are further able to displace said or each injection point relatively to the blank.

Other aspects and advantages of the invention will become apparent upon reading the description which follows, only given as a non-limiting example, and made with reference to the appended drawings, wherein:

DETAILED DESCRIPTION OF THE INVENTION

Figure 6:
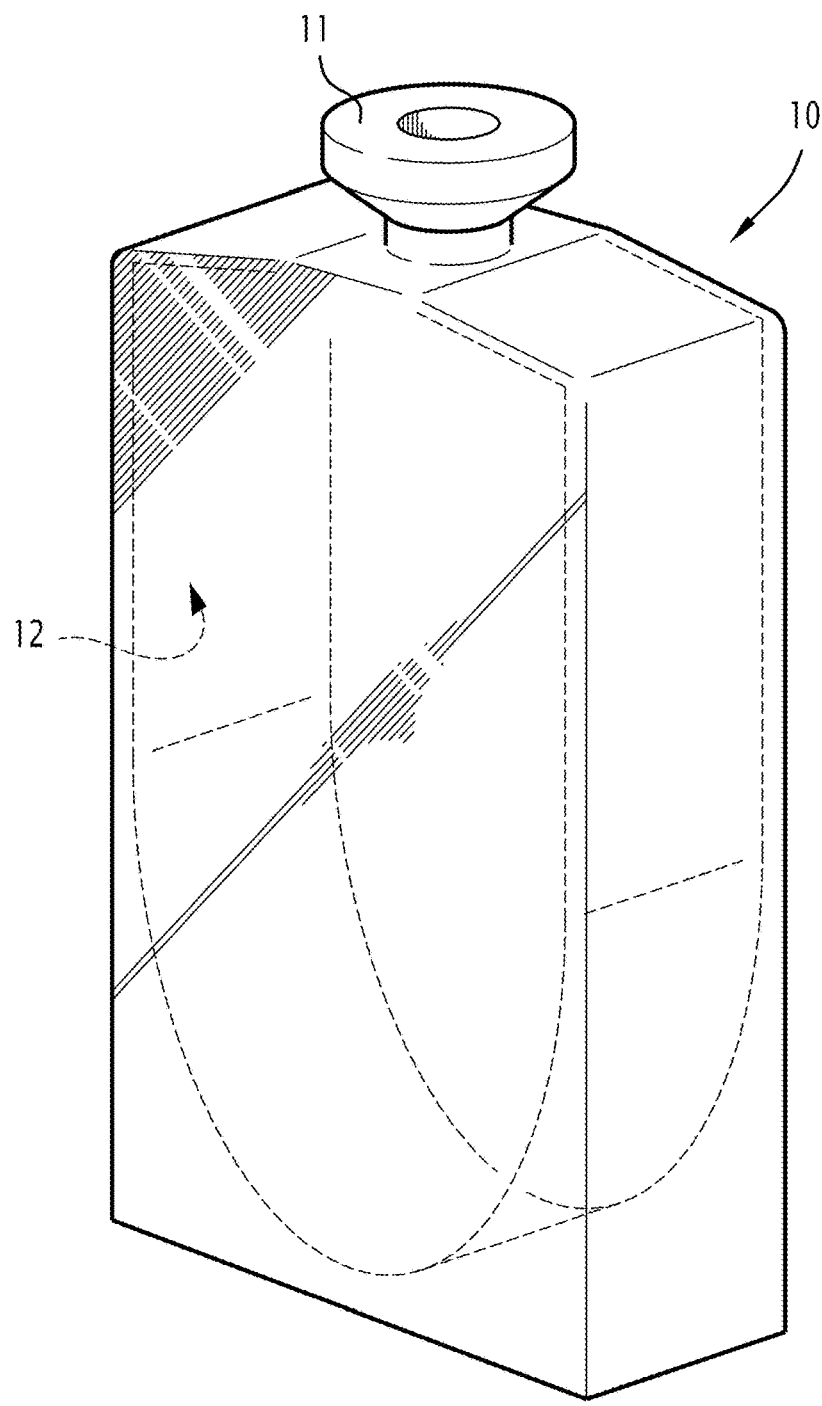
FIG. 6 is a schematic perspective view of the definitive hollow glass article.

In the following, the facility for applying the method according to the invention will be described for the manufacturing of a hollow glass article 10. The hollow article 10 for example is a flask with a general parallelepipedal shape, comprising a ring 11 with an inner diameter preferably comprised between 3 mm and 13 mm, as shown in FIG. 6.

In an alternative not shown, the hollow article 10 is a pot. The pot for example has an inner diameter of less than 105 mm.

The hollow article 10 has a glass inner distribution 12. By glass inner distribution is meant a particular shape of the internal wall of the flask due to a variation in the glass thickness between the external wall and the internal wall of the flask. By internal wall of the flask is meant the internal wall of the sides, the internal wall of the shoulders and the internal wall of the bottom of the flask.

Of course, this facility also allows the manufacturing of hollow articles of diverse shapes.

In the following of the description, the terms of "longitudinal" and "transverse" are defined as follows: the longitudinal direction corresponds to the height of the hollow article and the transverse direction corresponds to any direction perpendicular to the height of the hollow article. Moreover the terms of upstream and downstream are defined relatively to the flow direction of the pressurized gas.

Figure 1:
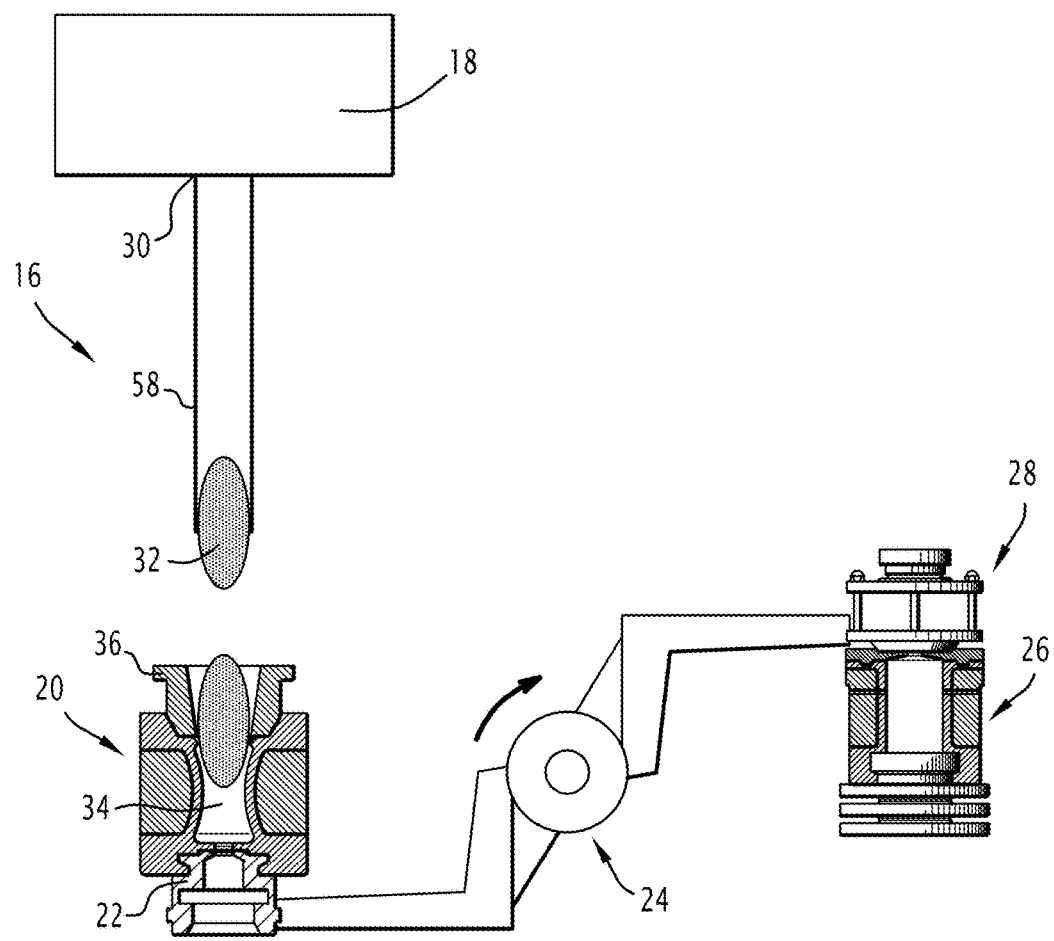
FIG. 1 is a schematic view of a first facility for manufacturing a hollow glass article, according to the invention, comprising a finishing mold and a blowing head.

A first manufacturing facility 16 for the hollow article 10 is illustrated in FIG. 1. The facility 16 comprises a molten glass distributor 18 placed at the outlet of a furnace, not shown, a blank mold 20 and a member 22 for blowing a first pressurized gas inside the blank mold 20. The first pressurized gas is for example air and the blowing member 22 is connected to an air supply device, not shown.

The facility 16 further comprises a manipulation arm 24, a finishing mold 26 and a head 28 for blowing at least one second pressurized gas inside the finishing mold 26. The second pressurized gas is for example air.

The distributor 18, of a known type, is able to deliver to the outlet of a casting orifice 30, at least one molten glass parison 32.

The blank mold 20 includes an imprint 34 intended to receive the parison 32. For this purpose, the imprint 34 includes at its inlet, a funnel 36.

As known per se, the blowing member 22 is able to inject pressurized air inside the blank mold 20 in order to form a blank 38 of the article 10. More particularly, the blowing member 22 is able to inject air for compressing the glass, for forming on the blank 38 the ring 11 and for shaping the bottom of the blank 38.

Alternatively, the blank mold 20 and the blowing member 22 are replaced by a member for pressing molten glass.

Figure 2:
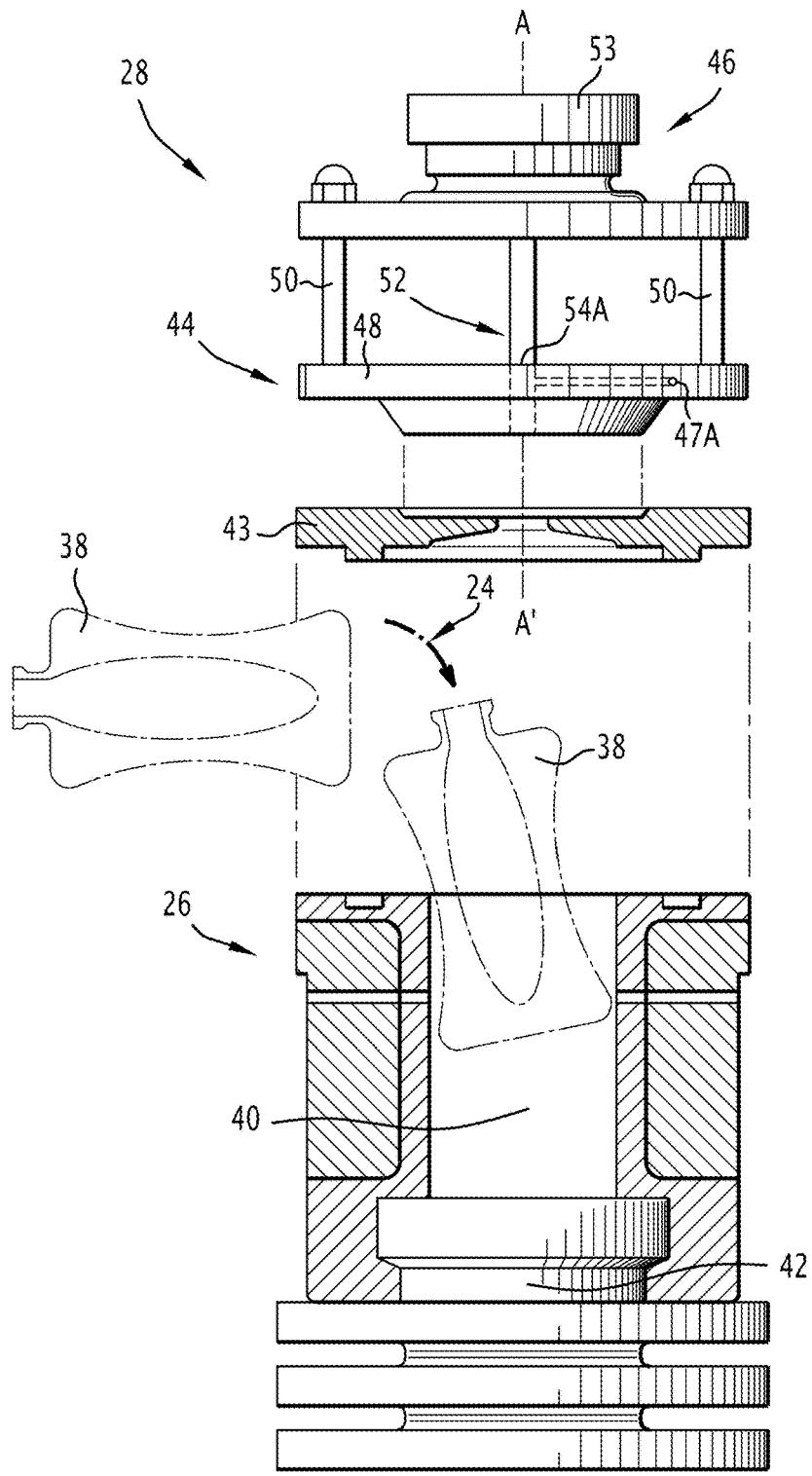
FIG. 2 is a schematic vertical sectional view of the finishing mold and of the blowing head of FIG. 1, the blowing head comprising an injection nozzle.

As this appears in FIGS. 1 and 2, the manipulation arm 24 is able to remove the blank 38 from the blank mold 20 and then to transfer the blank 38 from the blank mold 20 as far as the finishing mold 26.

As illustrated in FIG. 2, the finishing mold 26 includes an imprint 40 for which the lower portion is able to be obturated by a movable bottom 42, and for which the upper portion is able to be obturated by a removable lid 43.

The blowing head 28 includes a removable support 44 and a member 46 for injecting the second pressurized gas, movably mounted relatively to the support 44. The blowing head 28 further includes a mechanical system for displacing the injection member 46 relatively to the support 44, not shown in the figures. Further, the blowing head 28 advantageously includes at least one aperture 47 for discharging the second pressurized gas towards the outside of the finishing mold 26. In the exemplary embodiment of FIGS. 2 to 5, the blowing head 28 comprises an aperture 47A for discharging the second pressurized gas towards the outside of the finishing mold 26. The aperture 47A has a circular shape. Alternatively, the aperture 47A has a different shape from the circular shape. Still alternatively, the blowing head 28 does not include any discharge aperture 47.

The support 44 for example comprises a transverse frame 48 and two guide rods 50 attached to the frame 48. The transverse frame 48 has a lower portion, the shape of which makes that of the upper portion of the removable lid 43. In the exemplary embodiment of FIGS. 2 to 5, the support 44 is able to be added onto the removable lid 43, by fitting it in into the transverse frame 48 on the removable lid 43.

The injection member 46 is slidably mounted along both guide rods 50, at least between a first position, in which the second gas is injected into the inside of the blank 38, and a second position.

The injection member 46 includes at least one injection nozzle 52 for the second pressurized gas towards at least one predefined area of the blank 38. The injection member 46 also includes an air supply device connected to the nozzle 52, not shown in the figures, and a device 53 for applying a pressure profile to the second pressurized gas, connected to the nozzle 52.

Figure 3:
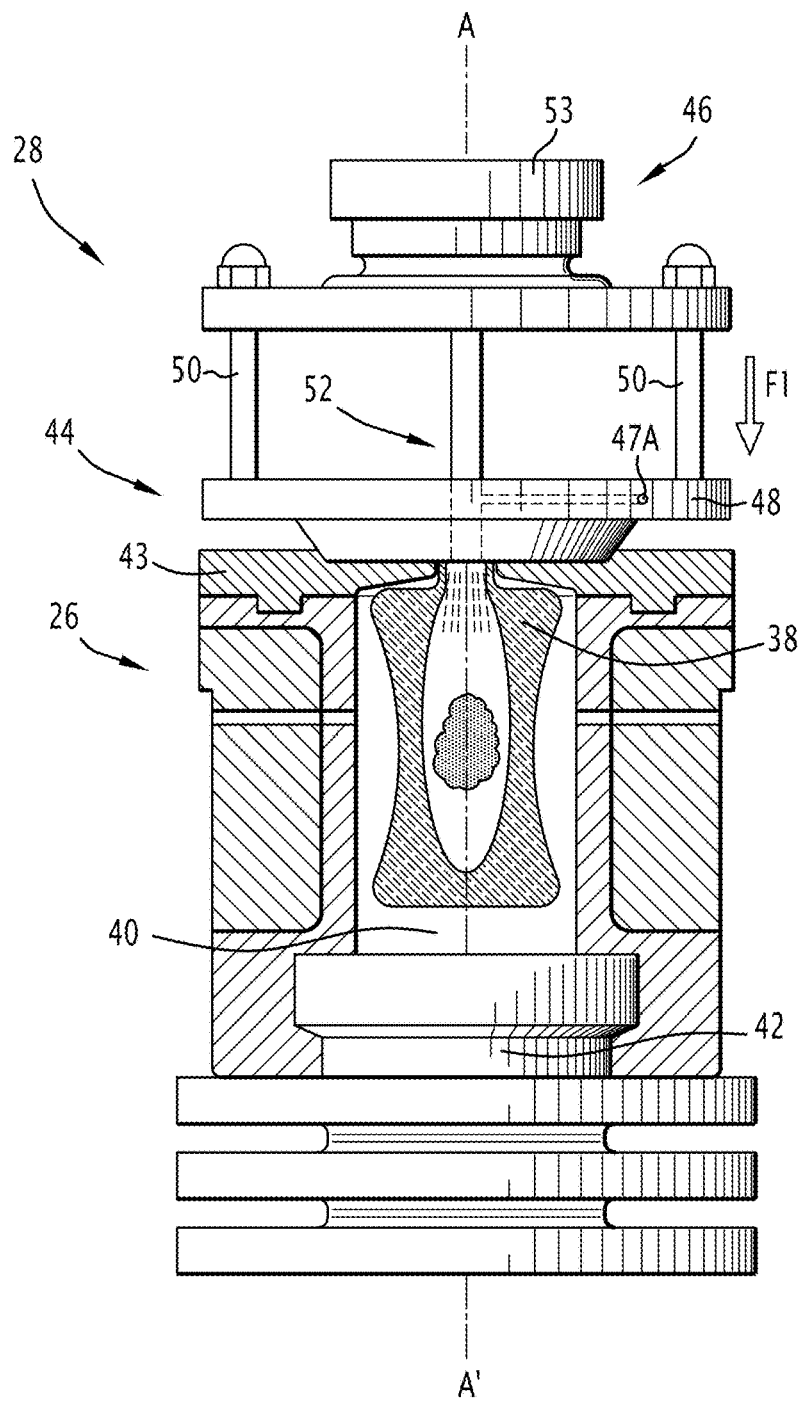
FIG. 3 is a schematic vertical sectional view of the finishing mold and of the blowing head of FIG. 2, in a first position of the injection nozzle in a blank of the article.
Figure 4:
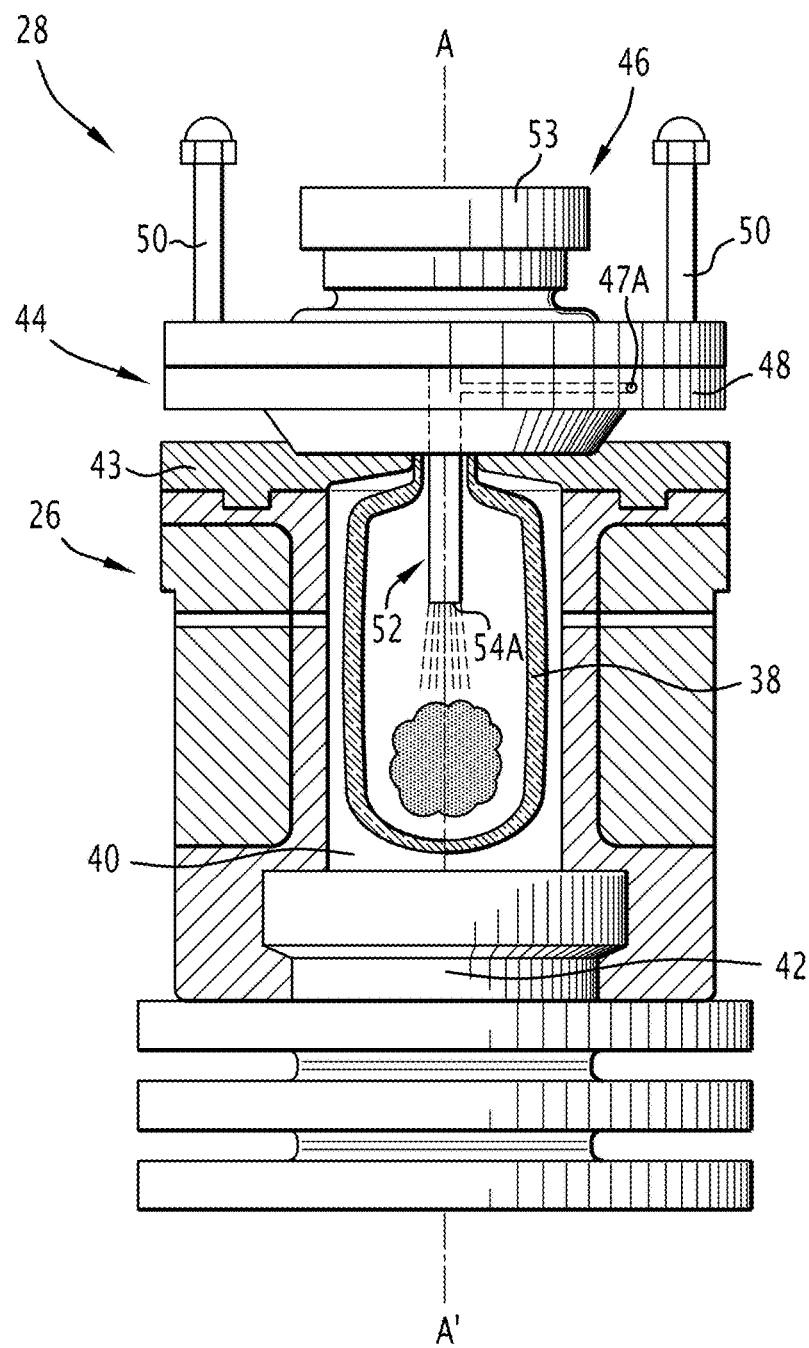
FIG. 4 is a view similar to FIG. 3, in a second position of the injection nozzle in the blank.

The injection nozzle 52 extends along a longitudinal axis A-A' and is mounted so as to be mobile in a longitudinal translation relatively to the support 44, between a retracted position, illustrated in FIG. 3 and corresponding to the first position of the injection member 46, and an inserted position, illustrated in FIG. 4 and corresponding to the second position of the injection member 46.

The injection nozzle 52 comprises at least one outlet orifice 54 for the second pressurized gas inside the finishing mold 26. In the exemplary embodiment of FIGS. 2 to 4, the injection nozzle 52 comprises an outlet orifice 54A for the second pressurized gas inside the finishing mold 26. The orifice 54A forms a point for injecting the second pressurized gas inside the finishing mold 26. The orifice 54A has a circular shape and extends towards the downstream end of the nozzle 52.

Alternatively, the orifice 54A has a different shape from the circular shape. Still alternatively, the orifice 54 extends on a side wall of the injection nozzle 52.

Figure 7:
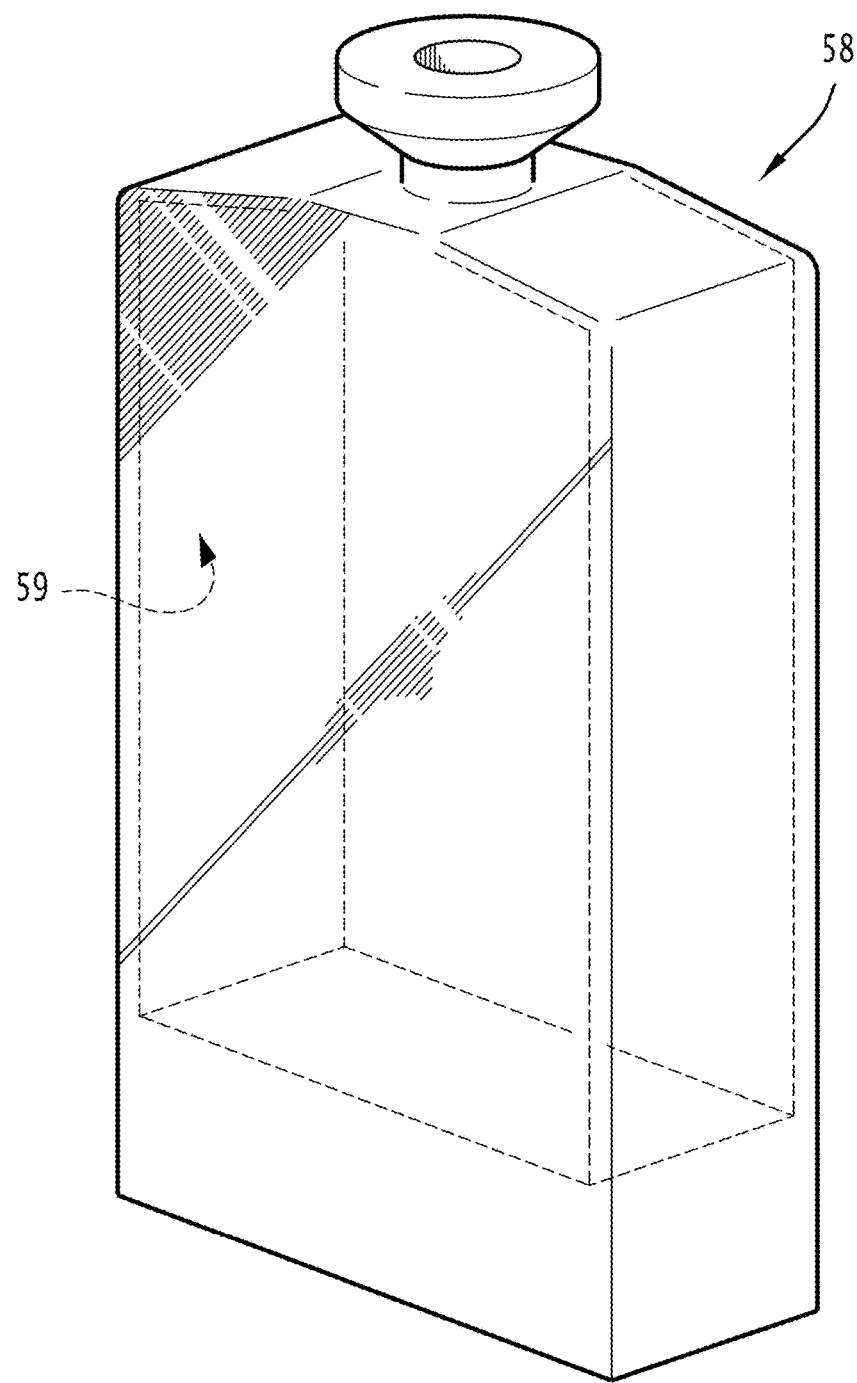
FIG. 7 is a schematic perspective view of a hollow glass article obtained by a manufacturing method of the prior art.
Figure 8:
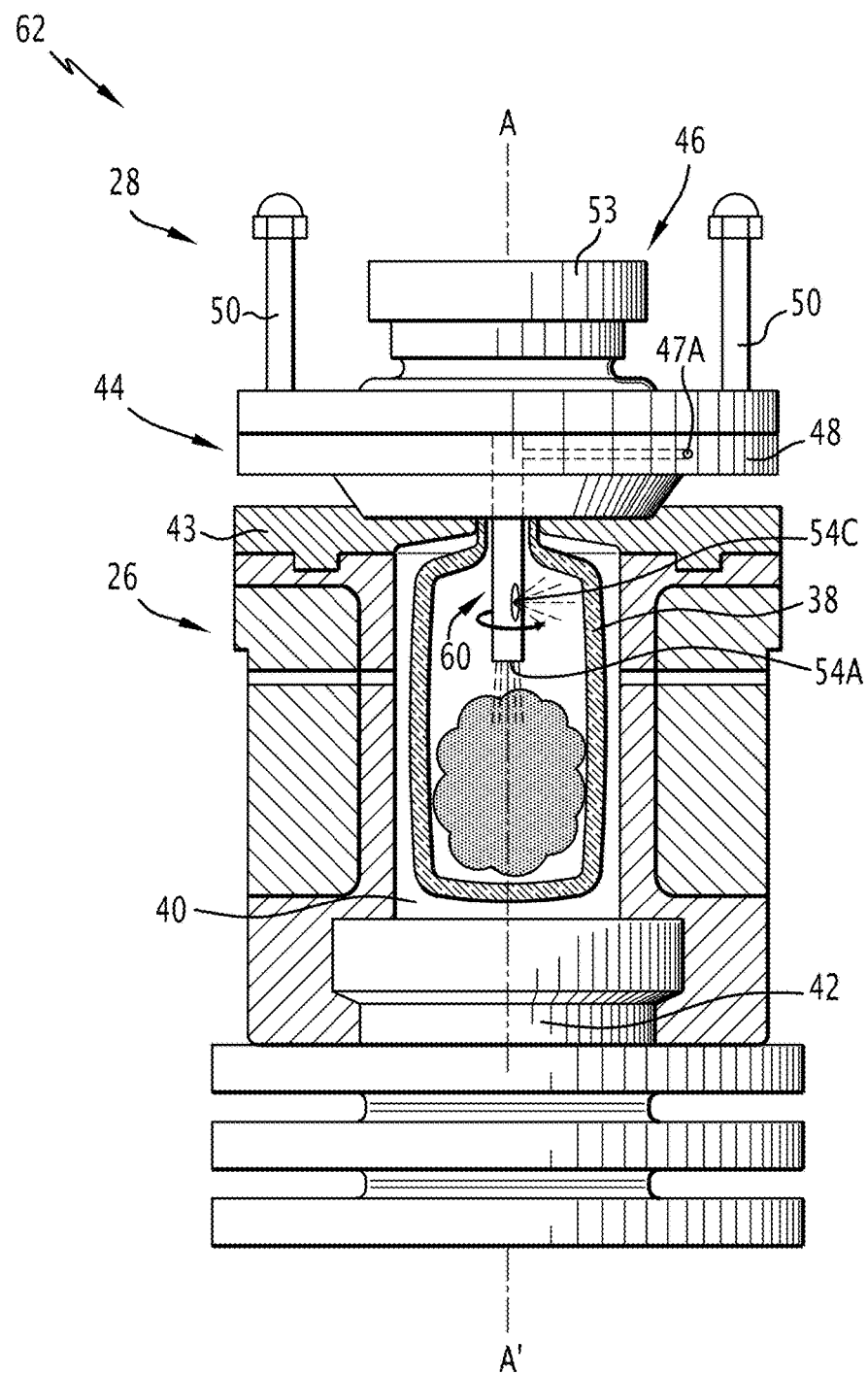
FIG. 8 is a view similar to FIG. 2 of an injection nozzle of a second manufacturing facility according to the invention.

Alternatively, the injection nozzle 52 comprises at least two outlet orifices 54 for the second pressurized gas inside the finishing mold 26, as illustrated in FIG. 7. According to this alternative, at least two of the outlet orifices 54 advantageously have different shapes and/or diameters. Each outlet orifice 54 extends towards the downstream end or on a side wall of the injection nozzle 52. This gives the possibility of obtaining injection of the second gas into the finishing mold 26 parallel to the direction of flow of the second gas in the nozzle 52 and/or tilted by an angle relatively to this direction of flow, for example by an angle substantially equal to 90 degrees.

Further, the injection nozzle 52 advantageously comprises at least one aperture 56 for discharging the second pressurized gas towards the outside of the finishing mold 26. In the exemplary embodiment of FIGS. 2 to 4, the injection nozzle 52 comprises a circular aperture 56A for discharging the second pressurized gas towards the outside of the finishing mold 26.

In its retracted position, the injection nozzle 52 is able to inject the second pressurized gas inside the blank 38. In its inserted position, in which the nozzle 52 is inserted inside the finishing mold 26 and of the blank 38, the nozzle 52 is advantageously able to displace the injection point 54A and to direct the second pressurized gas towards at least one predefined area of the blank 38, as detailed subsequently.

The device 53 is able to apply to the second gas a pressure profile as detailed subsequently.

The method for manufacturing the hollow article 10 by means of the facility 16 will now be described.

During a first step of the method, the distributor 18 delivers at its outlet the parison 32, which is conventionally cut with scissors, not shown. At the end of this step, at the outlet of the distributor 18, the parison 32 falls into a conduit 58 which leads it into the funnel 36, and then into the imprint 34 of the blank mold 20.

During a subsequent step, the blank 38 is removed from the mold and transferred by the manipulation arm 24 from the blank mold 20 as far as the finishing mold 26. The blank 38 is introduced by the manipulation arm 24 inside the imprint 40 of the finishing mold 26, as illustrated in FIG. 2.

The lid 43 is then closed, during a subsequent step, on the upper portion of the imprint 40, thereby obturating the imprint 40. The support 44 of the blowing head 28 is then added onto the lid 43, as illustrated in FIG. 3. During this same step, the nozzle 52 injects the second gas at a first pressure, a so-called forming pressure, the nozzle 52 being in its retracted position. This injection of the second gas at a forming pressure allows an increase in the volume of the blank 38 until the latter attains the walls and the bottom of the finishing mold 26, in order to form the outer glass distribution of the article 10. The injection of a gas at a forming pressure is standard and necessary for forming the article 10.

The nozzle 52 is then stopped and the mechanical system displaces the injection nozzle 52 from its retracted position as far as its inserted position, in the direction of the arrow F1 illustrated in FIG. 3. The nozzle 52 then injects, in its inserted position, the second gas at a second pressure, a so-called finishing pressure, towards at least one predefined area of the blank 38, in order to form the inner glass distribution 12 of the specific article. The injection point 54A of the second pressurized gas is thus displaced by the nozzle 52, from the retracted position of the nozzle as far as its inserted position. In the exemplary embodiment, the value of the finishing pressure is different from the value of the forming pressure. The value of the forming pressure is for example comprised between 0 bars and 3 bars. The value of the finishing pressure is for example comprised between 3 bars and 7 bars. Alternatively, the value of the finishing pressure is equal to the value of the forming pressure.

Alternatively or additionally, the nozzle 52 further injects, all along its displacement between its retracted and inserted positions, the second gas at the finishing pressure towards certain discretely distributed areas of the blank 38. By discretely distributed area, is meant a limited area of the internal wall of the article 10, wherein the intention is to give a particular shape to the internal wall. During this injection of the second gas at the finishing pressure, via the nozzle 52, a pressure profile is advantageously applied to the second gas, via the device 53. The pressure profile extends between a minimum pressure for example substantially equal to 3 bars, and a maximum pressure for example substantially equal to 7 bars. The finishing pressure therefore varies during the displacement of the nozzle 52. The finishing pressure does not necessarily vary linearly between the minimum pressure and the maximum pressure; it may vary so as to have pressure peaks in certain predetermined locations of the displacement of the nozzle 52 depending on the shape which is desirably given to the internal wall. The injection nozzle 52 allows injection of the second gas at a variable finishing pressure in certain areas distributed over the height of the hollow article 10, i.e. along the longitudinal axis A-A'.

Still alternatively, the step for injecting through the nozzle 52 the second gas at the forming pressure and the step for injecting through the nozzle 52 the second gas at the finishing pressure along its displacement between its retracted and inserted positions are carried out simultaneously. According to this alternative, the second gas injected through the nozzle 52, all along its displacement between its retracted and inserted positions, simultaneously allows an increase in the volume of the blank 38 until the latter attains the walls and the bottom of the finishing mold 26 and formation of an inner glass distribution 12 of the specific article, by displacement of the injection point 54A. According to this alternative, a pressure profile is also advantageously applied to the second gas.

Advantageously, during the step for injecting the second gas, a portion of the second gas is for example periodically discharged through the discharge aperture 47A towards the outside of the finishing mold 26. This gives the possibility of obtaining a homogenous and industrial reproducible inner glass distribution 12. In the alternative according to which the blowing head 28 does not include any discharge aperture 47, the discharge of the second gas towards the outside of the finishing mold 26 is for example carried out via a play between the nozzle 52 and the orifice for inserting the nozzle 52 into the finishing mold 26, in the inserted position of the nozzle.

Figure 5:
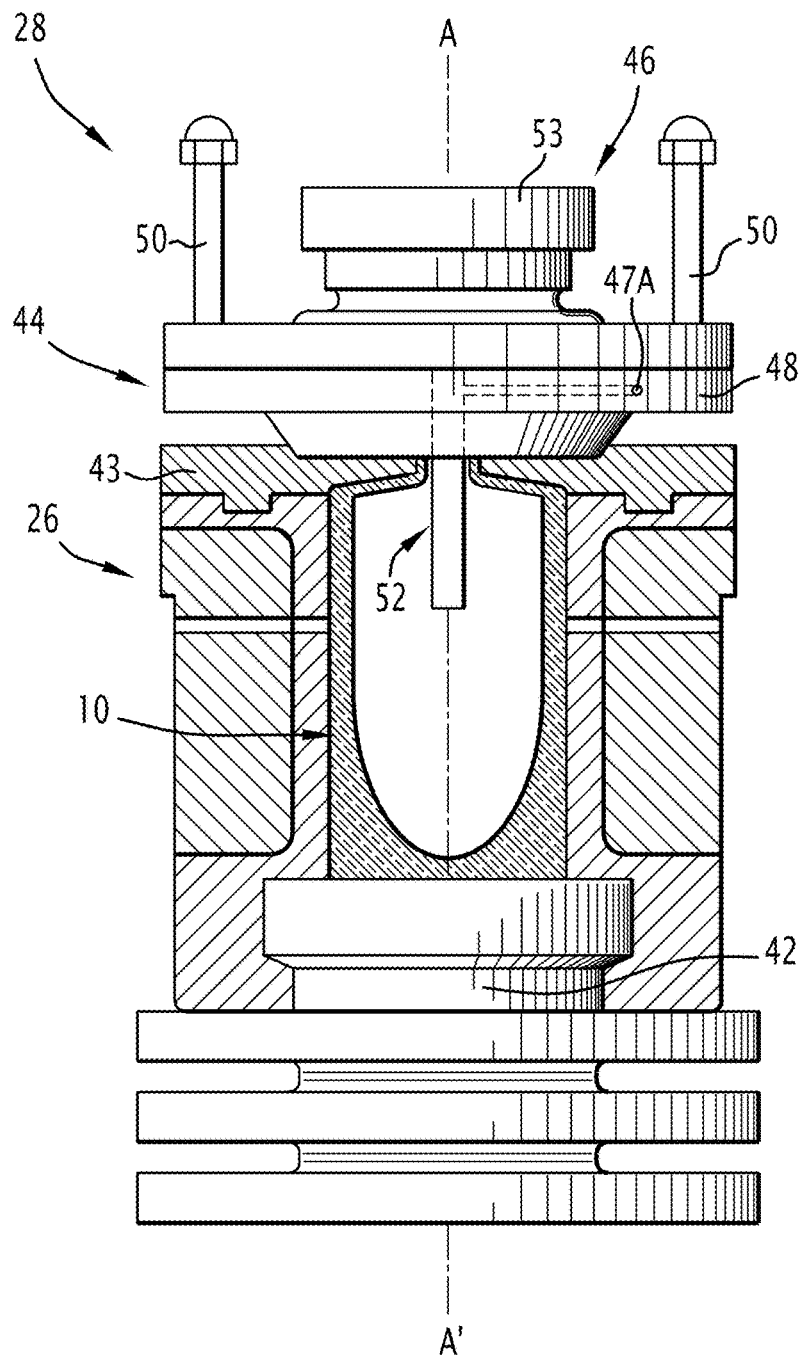
FIG. 5 is a view similar to FIG. 3, illustrating a hollow glass article formed in the finishing mold.

At the end of this step for injecting the second gas, the hollow article 10 not removed from the mold, is obtained as illustrated in FIG. 5. The hollow article is then removed from the finishing mold 26 by withdrawing the movable bottom 42. The hollow article 10 obtained at the end of the manufacturing method is illustrated in FIG. 6. In the exemplary embodiment, the hollow article 10 has a substantially concave inner glass distribution 12.

In FIG. 7, is illustrated a hollow article 58 obtained by a manufacturing method of the prior art. The hollow article 58 has a standard inner glass distribution 59, according to a flat model. By comparison with the hollow article 58 of the prior art, the hollow article 10 obtained with the method according to the invention surprisingly has a specific inner glass distribution 12. The inner distribution 12 of the hollow article 10 has the same weight of glass as the inner distribution 59 of the hollow article 58. The concave portion of the inner distribution 12 of the hollow article 10 is formed in a region similar to the one in which extends the glass thickness of the bottom of the hollow article 58.

It is thus conceivable that the manufacturing facility 16 and the manufacturing method described above give the possibility of obtaining a hollow article having a specific and customizable inner glass distribution, while retaining acceptable production rates. Indeed, it is understood that by varying the pressure and the second gas applied in certain areas of the hollow article, the second gas will «dig» or will «push» more or less the glass present in these areas, which will allow formation of recesses and of raised portions in these areas by varying the glass thickness between the internal wall and the external wall of these areas.

An injection nozzle 60 of a second facility 62 for manufacturing the hollow article 10 is illustrated in FIG. 7. In this figure, the elements similar to the first embodiment described earlier are marked with identical references.

In a similar way to the injection nozzle 52 of the first facility 16, the injection nozzle 60 extends along a longitudinal axis A-A' and is mounted so as to be movable in a longitudinal translation relatively to the support 44.

Unlike the injection nozzle 52, the injection nozzle 60 is further mounted, in its inserted position, so as to be movable in rotation around its longitudinal axis A-A'. The mechanical system for displacing the injection member 46 is further able to set the injection nozzle 60 into rotation around its longitudinal axis A-A'. Moreover, unlike the injection nozzle 52, the injection nozzle 60 further comprises a second outlet orifice 54C of the second pressurized gas inside the finishing mold 26. The second orifice 54C extends over a side wall of the nozzle 60 and is for example of an elongated shape. The second orifice 54C forms a point for injecting the second pressurized gas inside the finishing mold 26.

Alternatively, the injection nozzle 60 comprises at least one outlet orifice 54 extending to the downstream end or on a side wall of the injection nozzle 60. One skilled in the art will of course understand that in the case when the injection nozzle 60 comprises at least two outlet orifices 54, the outlet orifices 54 advantageously have different shapes and/or diameters. In this case, each outlet orifice 54 extends to the downstream end or on a side wall of the injection nozzle 60.

During the injection step for the second gas, at the finishing pressure, in the inserted position of the nozzle 60, the nozzle 60 is set into rotation around its longitudinal axis A-A', so as to direct the second gas towards certain discretely distributed areas of the blank 38. These additional areas are areas for forming specific inner glass distributions, different from the inner glass distributions obtained by the first manufacturing facility 16. The second point 54C for injecting the second pressurized gas is thus displaced by the nozzle 60, around its longitudinal axis A-A'.

The injection nozzle 60 allows injection of the second gas at a finishing pressure variable in certain areas distributed on the circumference of the hollow article 10, i.e. along a transverse plane. The second manufacturing facility 62 and the associated manufacturing method thereby give the possibility of obtaining a larger variety of specific inner glass distributions for the hollow article 10.

The remainder of the operation of this second embodiment is similar to the operation of the first embodiment, and is therefore not described again.

The invention is not limited to these specific embodiments. In particular, in another embodiment, not shown, the injection nozzle is no longer movable in longitudinal translation relatively to the support 44. In this embodiment, the injection nozzle is exclusively movable in rotation around its longitudinal axis A-A'.

Of course, one skilled in the art will understand that all the combinations described earlier, relating to the number, the position, the diameter and the shape of the outlet orifices, may also be contemplated for the injection nozzle according to this embodiment.

According to another embodiment, not shown, the injection nozzle is fixed and the finishing mold is mounted so as to be movable in rotation around the longitudinal axis A-A'.

According to another embodiment, not shown, the injection nozzle and the finishing mold are mounted so as to be movable in rotation around the longitudinal axis A-A'.

Both of the latter embodiments give the possibility of obtaining additional inner glass distributions for the hollow article. Moreover, the invention applies in the same way to any injection nozzle having the aforementioned characteristics, regardless of its length or of its diameter.

By means of the invention which has just been described, it is conceivable that the facility and the manufacturing method according to the invention give the possibility of obtaining a hollow article having a specific and customizable inner glass distribution. Indeed, by acting on the translation and/or rotation movements of the injection nozzle, on the length and on the diameter of the nozzle, on the diameter of the optional discharge aperture, as well as on the number, the shape and the diameter of the outlet orifices of the nozzle, and on the different possible combinations between these characteristics, it is possible to obtain a large number of possible specific inner distributions for the hollow article and thereby sculpt as desired the interior of the article. More particularly, the nozzle may have a different shape from the standard cylindrical shape, while allowing insertion of the nozzle inside the finishing mold and the blank of the article. In particular, a wavy or parallelepipedal shape may be contemplated for the nozzle. These different possible shapes for the nozzle thus allow other specific inner distributions to be obtained for the hollow article.

The device for applying a pressure profile moreover allows a further increase in the number of possible specific inner distributions, by acting on the pressure variations of the second injected gas.

The description was made with reference to injection of pressurized air for forming the hollow glass article in the finishing mold. However, it is understood that the invention applies in the same way to the injection of a gas under a pressure different from air or further to joint injection, by the injection nozzle, of a gas and of a non-gaseous product, for example in order to produce inner heat polishing of the glass.

Upon reading the preceding embodiments, it is understood that the injection nozzle for the gas is able to displace said or each injection point 54A, 54C relatively to the blank 38. Thus, during the formation of the article 10 in the finishing mold 26, said or each point 54A, 54C for injecting the second pressurized gas is displaced by the nozzle, relatively to the blank 38.

What is claimed is:

1. A method for manufacturing a hollow glass article, comprising the following steps:
    obtaining a blank of the hollow glass article in a blank mold,
    introducing said blank from the blank mold into a finishing mold, and
    forming the hollow glass article in the finishing mold, by injecting at least one gas at a forming pressure inside the blank,
    wherein, during forming of the hollow glass article in the finishing mold, at least one gas injection point is displaced in the finishing mold so as to direct the at least one gas towards at least one predefined area of the blank, the at least one gas being injected at least at one finishing pressure in order to form a specific inner glass distribution of the hollow glass article,
    wherein the at least one gas forms a recess or a raised portion in said at least one predefined area by varying a glass thickness between an internal wall and an external wall of said at least one predefined area.

2. The method according to claim 1, wherein, during forming of the hollow glass article in the finishing mold, said at least one gas injection point is displaced by longitudinal translation for directing the at least one gas towards certain discretely distributed areas of the blank, at least between a first gas injection position inside the blank and a second gas injection position inside the blank.

3. The method according to claim 1, wherein, during the formation of the hollow glass article in the finishing mold, said or each at least one gas injection point is displaced by rotation so as to direct the at least one gas towards certain discretely distributed areas of the blank.

4. The method according to claim 1, wherein, during forming of the hollow glass article in the finishing mold, a portion of the injected at least one gas is discharged towards the outside of the finishing mold.

5. The method according to claim 1, wherein, during forming of the hollow glass article in the finishing mold, a pressure profile is applied to the at least one gas injected at the at least one finishing pressure, the pressure profile extending between a minimum pressure equal to 3 bars and a maximum pressure equal to 7 bars.

6. The method according to claim 1, wherein, during forming of the hollow glass article in the finishing mold, said at least one gas injection point is displaced relatively to the blank.

7. The method according to claim 1, wherein the at least one finishing pressure is different from the forming pressure.

8. A method for manufacturing a hollow glass article, comprising the following steps:
    obtaining a blank of the hollow glass article in a blank mold,
    introducing said blank from the blank mold into a finishing mold, and
    forming the hollow glass article in the finishing mold, by injecting at least one gas at a forming pressure inside the blank,
    wherein, during forming of the hollow glass article in the finishing mold, at least one gas injection point is displaced in the finishing mold so as to direct the at least one gas towards at least one predefined area of the blank, the at least one gas being injected at least at one finishing pressure in order to form a specific inner glass distribution of the hollow glass article,
    wherein, during forming of the hollow glass article in the finishing mold, said at least one gas injection point is displaced for directing the at least one gas towards certain discretely distributed areas of the blank, at least between a first gas injection position inside the blank and a second gas injection position inside the blank.

9. The method according to claim 8, wherein, during forming of the hollow glass article in the finishing mold, a portion of the injected at least one gas is discharged towards the outside of the finishing mold.

10. The method according to claim 8, wherein, during forming of the hollow glass article in the finishing mold, said at least one gas injection point is displaced by longitudinal translation.

* * * * *